US012170017B2

(12) United States Patent
Nallaperumal et al.

(10) Patent No.: US 12,170,017 B2
(45) Date of Patent: Dec. 17, 2024

(54) METHOD TO TEST SMOKE ALARM SOUNDERS

(71) Applicant: Carrier Corporation, Palm Beach Gardens, FL (US)

(72) Inventors: Pirammanayagam Nallaperumal, Telangana (IN); Ashis Kumar Sinha, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 150 days.

(21) Appl. No.: 17/953,765

(22) Filed: Sep. 27, 2022

(65) Prior Publication Data

US 2023/0102752 A1 Mar. 30, 2023

Related U.S. Application Data

(60) Provisional application No. 63/249,124, filed on Sep. 28, 2021.

(51) Int. Cl.
*G08B 17/00* (2006.01)
*G08B 29/14* (2006.01)

(52) U.S. Cl.
CPC .................................. *G08B 29/145* (2013.01)

(58) Field of Classification Search
None
See application file for complete search history.

(56) References Cited

U.S. PATENT DOCUMENTS

| | | | | |
|---|---|---|---|---|
| 6,970,077 B2 * | 11/2005 | Johnson | G08B 29/126 340/517 |
| 8,466,800 B1 * | 6/2013 | Billman | G08B 29/145 340/628 |
| 10,078,959 B2 | 9/2018 | Rossi et al. | |
| 10,380,878 B2 | 8/2019 | Warren et al. | |
| 2020/0312121 A1 * | 10/2020 | Shiner | G08B 26/008 |
| 2023/0368649 A1 * | 11/2023 | Gajula | G08B 29/145 |

FOREIGN PATENT DOCUMENTS

DE 102019215049 A1 4/2021

OTHER PUBLICATIONS

Author Unknown, "Automatic Sound Check test" Google Nest Help, Nest Protect's 2022, 2 Pages. https://support.google.com/googlenest/answer/9242130#zippy=%2Cwhat-happens-during-sound-check%2Cmanually-test-any-time%2Cchange-sound-check-settings%2Cwhat-to-do-if-sound-check-finds-a-problem%2Cgoogle-doesnt-receive-sound-check-recordings.

* cited by examiner

*Primary Examiner* — K. Wong
(74) *Attorney, Agent, or Firm* — CANTOR COLBURN LLP

(57) ABSTRACT

A method of testing a smoke alarm system including: receiving a first manual input via an input device of a mobile device from a user of the mobile device, the first manual input indicating that the user would like to initiate a test of the smoke alarm system including one or more smoke alarms, the one or more smoke alarms including at least a first smoke alarm; determining a time slot allocation, the time slot allocation indicating when each of the one or more smoke alarms should emit an alarm; transmitting the time slot allocation to each of the one or more smoke alarms, wherein each of the one or more smoke alarms is configured to activate the alarm in accordance with the time slot allocation; activating a first alarm on the first smoke alarm; and receiving a second manual input indicating that the user has heard the first alarm.

15 Claims, 2 Drawing Sheets

METHOD TO TEST SMOKE ALARM SOUNDERS

CROSS-REFERENCE TO RELATED APPLICATIONS

This application claims the benefit of Provisional Application No. 63/249,124 filed Sep. 28, 2021, the disclosure of which is incorporated herein by reference in its entirety.

BACKGROUND

The embodiments herein generally relate to a smoke alarm and more specifically to a system and method for testing a smoke alarm.

Smoke alarm are commonly used and both residential and commercial buildings. Smoke alarms are configured to detect the presence of a fire and alert individuals within the building of the presence of a fire. The alarm may include an audible alarm to capture the attention of individuals within the building.

BRIEF DESCRIPTION

According to one embodiment, a method of testing a smoke alarm system is provided. The method includes: receiving a first manual input via an input device of a mobile device from a user of the mobile device, the first manual input indicating that the user would like to initiate a test of the smoke alarm system including one or more smoke alarms, the one or more smoke alarms including at least a first smoke alarm; determining a time slot allocation, the time slot allocation indicating when each of the one or more smoke alarms should emit an alarm; transmitting the time slot allocation to each of the one or more smoke alarms, wherein each of the one or more smoke alarms is configured to activate the alarm in accordance with the time slot allocation; activating a first alarm on the first smoke alarm in accordance with the time slot allocation; and receiving a second manual input via the input device of the mobile device from the user of the mobile device, the second manual input indicating that the user has heard the first alarm.

In addition to one or more of the features described above, or as an alternative, further embodiments may include activating the alarm on each of the one or more smoke alarms in accordance with the time slot allocation.

In addition to one or more of the features described above, or as an alternative, further embodiments may include that receiving the second manual input via the input device further includes detecting the user shaking the mobile device.

In addition to one or more of the features described above, or as an alternative, further embodiments may include that receiving the second manual input via the input device further includes detecting the user touching a touch screen or a button of the mobile device.

In addition to one or more of the features described above, or as an alternative, further embodiments may include displaying a message on a display device of the mobile device indicating that the first smoke alarm has passed the test in response to the second manual input.

In addition to one or more of the features described above, or as an alternative, further embodiments may include that the second manual input is received within a designated response time after the first smoke alarm has activated the first alarm.

In addition to one or more of the features described above, or as an alternative, further embodiments may include displaying a message on a display device of the mobile device indicating that the first smoke alarm has passed the test in response to the second manual input.

In addition to one or more of the features described above, or as an alternative, further embodiments may include that the one or more smoke alarms further includes a second smoke alarm, and wherein the time slot allocation indicates that the first smoke alarm should emit a first alarm at a first time slot and the second smoke alarm should emit a second alarm at a second time slot, the second time slot occurring a second time period after the first time slot.

In addition to one or more of the features described above, or as an alternative, further embodiments may include activating the first alarm on the first smoke alarm at the first time slot; and activating the second alarm on the second smoke alarm at the second time slot.

In addition to one or more of the features described above, or as an alternative, further embodiments may include not receiving any manual input within a designated response time after the first smoke alarm has activated the first alarm or between the first time slot and the second time slot; receiving a second manual input via the input device of the mobile device from the user of the mobile device, the second manual input indicating that the user has heard the second alarm.

In addition to one or more of the features described above, or as an alternative, further embodiments may include displaying a first message on a display device of the mobile device indicating that the first smoke alarm has failed the test in response to not receiving any manual input within the designated response time after the first smoke alarm has activated the first alarm or between the first time slot and the second time slot; and displaying a second message on the display device of the mobile device indicating that the second smoke alarm has passed the test in response to the second manual input.

In addition to one or more of the features described above, or as an alternative, further embodiments may include receiving a second manual input via the input device of the mobile device from the user of the mobile device, the second manual input indicating that the user has heard the first alarm; and receiving a third manual input via the input device of the mobile device from the user of the mobile device, the second manual input indicating that the user has heard the second alarm.

In addition to one or more of the features described above, or as an alternative, further embodiments may include displaying a first message on the mobile device indicating that the first smoke alarm has passed the test in response to the second manual input; and displaying a second message on the mobile device indicating that the first smoke alarm has passed the test in response to the third manual input.

In addition to one or more of the features described above, or as an alternative, further embodiments may include receiving a second manual input via the input device of the mobile device from the user of the mobile device, the second manual input indicating that the user has heard the second alarm; and not receiving any manual input within a designated response time after the second smoke alarm has activated the second alarm.

In addition to one or more of the features described above, or as an alternative, further embodiments may include displaying a first message on the mobile device indicating that the first smoke alarm has passed the test in response to the second manual input; and displaying a second message on the mobile device indicating that the second smoke alarm has failed the test in response to not receiving any manual input within a designated response time after the second smoke alarm has activated the second alarm.

According to another embodiment, a computer program product tangibly embodied on a non-transitory computer readable medium is provided. The computer program product including instructions that, when executed by a processor, cause the processor to perform operations including: receiving a first manual input via an input device of a mobile device from a user of the mobile device, the first manual input indicating that the user would like to initiate a test of the smoke alarm system including one or more smoke alarms, the one or more smoke alarms including at least a first smoke alarm; determining a time slot allocation, the time slot allocation indicating when each of the one or more smoke alarms should emit an alarm; transmitting the time slot allocation to each of the one or more smoke alarms, wherein each of the one or more smoke alarms is configured to activate the alarm in accordance with the time slot allocation; activating a first alarm on the first smoke alarm in accordance with the time slot allocation; and receiving a second manual input via the input device of the mobile device from the user of the mobile device, the second manual input indicating that the user has heard the first alarm.

According to another embodiment, a method of testing a smoke alarm system is provided. The method includes: receiving a first manual input via an input device of a mobile device from a user of the mobile device, the first manual input indicating that the user would like to initiate a test of the smoke alarm system including one or more smoke alarms, the one or more smoke alarms including at least a first smoke alarm; determining a time slot allocation, the time slot allocation indicating when each of the one or more smoke alarms should emit an alarm; transmitting the time slot allocation to each of the one or more smoke alarms, wherein each of the one or more smoke alarms is configured to activate the alarm in accordance with the time slot allocation; activating a first alarm on the first smoke alarm in accordance with the time slot allocation; and not receiving any manual input within a designated response time after the first smoke alarm has activated the first alarm.

In addition to one or more of the features described above, or as an alternative, further embodiments may include displaying a message on a display device of the mobile device indicating that the first smoke alarm has failed the test in response to not receiving any manual input within the designated response time after the first smoke alarm has activated the first alarm.

Technical effects of embodiments of the present disclosure include a user initiated test of a smoke alarm system where the smoke alarms are scheduled to alarm in specific time slots while a user confirms via an application whether they hear each alarm.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As will be described below, smoke alarm systems often need to be tested. If there are a lot of smoke alarms in a single smoke alarm system the testing process may be long and difficult. The embodiments disclosed herein seek to provide an easy method of testing the smoke alarm system where the user initiates a test and then each of the smoke alarms emit an alarm in a set time slot sequence while the user confirms via a mobile device application whether they hear each alarm. If the user fails to hear an alarm of a specific smoke alarm at its set time slot then that specific smoke alarm may be malfunctioning.

Figure 1:
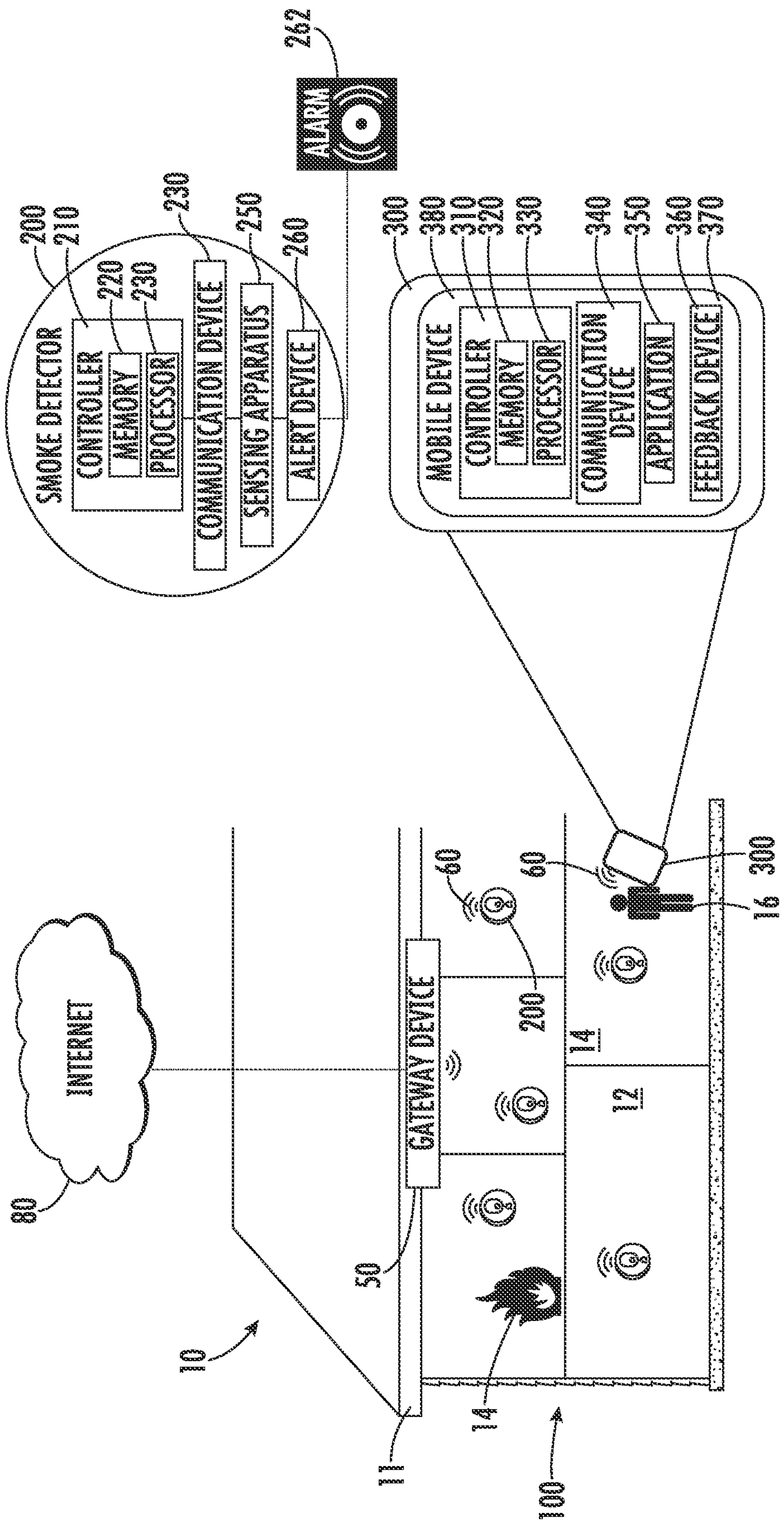
FIG. 1 is a perspective view of a structure in which a smoke alarm system is deployed, according to an embodiment of the present disclosure.

FIG. 1 is schematic view of a structure 10 and a smoke alarm system 200 for the structure 10, according to an embodiment of the present disclosure. The structure 10 may be configured as a residence, an industrial building, or a commercial building. For purposes of clarity and brevity, however, the following description will relate to the case where the structure 10 is configured as a single-family residence. The structure 10 thus includes a structural body 11 which defines an interior 12 and separates the interior 12 from an exterior 13. The interior 12 may be further divided into multiple rooms 14 and areas for various purposes.

The smoke alarm system 100 may include one or more smoke alarms 200. The smoke alarms 200 may be located in one or more rooms 14 within an interior 12 of the structure 10. In one example, each room 14 may contain a smoke alarm 200. Each of the smoke alarms 200 are configured to detect the presence of a fire 14. Each smoke alarm 200 is configured activate an alarm 262 upon detection of the presence of a fire 14. The alarm 262 may be a be an audible tone emitted from an alert device 260 of the smoke alarm 200. In embodiment, the alert device 260 may be a speaker or a bell. The alarm 262 is configured to capture the attention of an individual 20 within the structure 10.

The smoke alarm 200 may include a controller 210 configured to control operation of the smoke alarm 200. The controller 210 may be an electronic controller including a processor 230 and an associated memory 220 comprising computer-executable instructions (i.e., computer program product) that, when executed by the processor 230, cause the processor 230 to perform various operations. The processor 230 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 220 may be but is not limited to a random access memory (RAM), read only memory (ROM), or other electronic, optical, magnetic or any other computer readable medium.

The smoke alarm 200 includes a communication device 240 configured to communicate with a gateway device 50 through one or more wireless signals 60. The one or more wireless signals 60 may include Wi-Fi, Bluetooth, Zigbee, Sub-GHz RF channel, or any other wireless signal known to one of skill in the art. The gateway device 50 may be in electronic communication with the internet 80 through a wired and/or wireless connection.

The smoke alarm 200 also includes a sensing apparatus 250 configured detect the presence of a fire 14 using at least one of carbon-dioxide detection, heat detection, smoke particulate detection, or any other fire detection method known to one of skill in the art.

As discussed further herein, in order to test that the alert device 260 of the smoke alarm 200 is functioning properly an individual or user 16 may execute a testing procedure through a computer application 350. The user 16 may utilize the computer application 350 through a mobile device 300. The computer application 350 may be installed on the mobile device 300 or accessed via the internet 80 through the mobile device 300, such as, for example a software-as-a service.

The mobile device 300 may be a mobile computing device that is typically carried by a person, such as, for example a phone, a smart phone, a PDA, a smart watch, a tablet, a laptop, or any other mobile computing device known to one of skill in the art. In an embodiment, the mobile device 300 is a smart phone.

The mobile device 300 includes a controller 310 configured to control operations of the mobile device 300. The controller 310 may be an electronic controller including a processor 330 and an associated memory 320 comprising computer-executable instructions (i.e., computer program product) that, when executed by the processor 330, cause the processor 330 to perform various operations. The processor 330 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 320 may be but is not limited to a random access memory (RAM), read only memory (ROM), or other electronic, optical, magnetic or any other computer readable medium.

The mobile device 300 includes a communication device 340 configured to communicate with a gateway device 50 through one or more wireless signals 60. The one or more wireless signals 60 may include Wi-Fi, Bluetooth, Zigbee, Sub-GHz RF Channel or any other wireless signal known to one of skill in the art. The mobile device 300 is configured to communicate with the smoke alarm 200 through the gateway device 50. Communication from the mobile device 300 may have to pass through the gateway device 50 to the internet 80 and back through the gateway device 50 and then to the smoke alarm 200. Likewise, communication from the smoke alarm 200 may have to pass through the gateway device 50 to the internet 80 and back through the gateway device 50 and then to the mobile device 300.

The mobile device 300 may include a display device 380, such as for example a computer display, an LCD display, an LED display, an OLED display, a touchscreen of a smart phone, or any other similar display device known to one of the skill in the art. The user 16 operating the mobile device 300 is able to view the computer application 350 through the display device 380.

The mobile device 300 includes an input device 370 configured to receive a manual input from a user 16 (e.g., human being) of mobile device 300. The input device 370 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the mobile device 300, or any similar input device known to one of skill in the art. The user 16 operating the mobile device 300 is able to enter feedback into the computer application 350 through the input device 370. The input device 370 allows the user 16 operating the mobile device 300 to enter feedback into the computer application 350 via a manual input to input device 370. For example, the user 16 may respond to a prompt on the display device 380 by entering a manual input via the input device 370. In one example, the manual input may be a touch on the touchscreen. In an embodiment, the display device 380 and the input device 370 may be combined into a single device, such as, for example, a touchscreen.

The mobile device 300 device may also include a feedback device 360. The feedback device 360 may activate in response to a manual input via the input device 370. The feedback device 360 may be a haptic feedback vibration device and/or a speaker emitting a sound. The feedback device 360 device may activate to confirm that the manual input entered via the input device 370 was received via the computer application 350. For example, the feedback device 360 device may activate by emitting an audible sound or vibrate the mobile device 300 to confirm that the manual input entered via the input device 370 was received via the computer application 350.

Figure 2:
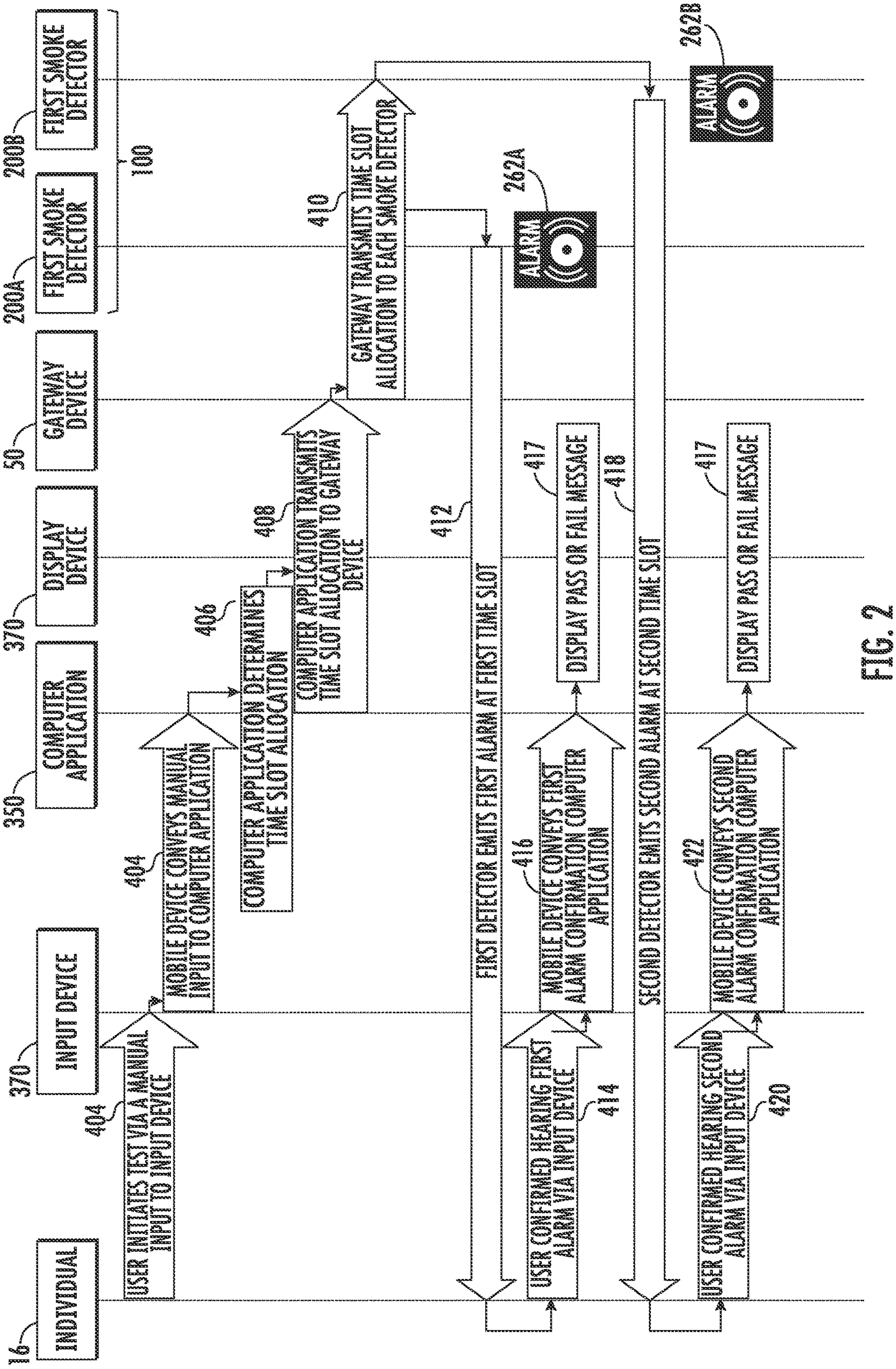
FIG. 2 is a flow process illustrating a method of testing the smoke alarm system of FIG. 1, according to an embodiment of the present disclosure.

Referring to FIG. 2, within continued references to FIG. 1, a flow diagram illustrating a method 400 of testing a smoke alarm system 100 is illustrated, in accordance with an embodiment of the present disclosure. In an embodiment, the method 400 may be performed by the computer application 350.

A block 404, a user 16 initiates a smoke alarm test via a first manual input via an input device 370 of a mobile device 300. At block 404, the mobile device 300 then conveys the manual input to the computer application 350. At block 406, the computer application 350 then determines a time slot allocation. The time slot allocation indicating when each of the one or more smoke alarms 200 should emit an alarm 262. The alarm 262 may be an audible tone. At block 408 the computer application 350 transmits the time slot allocation to the gateway device 50. At block 440, the gateway device 50 then transmits the time slot allocation to each smoke alarm 200A, 200B of the smoke alarm system 100. Block 410 may be divided into a first step of the gateway device 50 transmitting the slot allocation to the first smoke alarm 200A and the second smoke alarm 200B. It is understood that while FIG. 2 illustrates two smoke alarms 200A, 200B, the embodiments disclosed herein may be applicable to any number of smoke alarms 200. The slot allocation indicates that the first smoke alarm 200A should emit a first alarm 262A at a first time slot and the second smoke alarm 200B should emit a second alarm 262B at a second time slot. The second time slot occurs a second time period after the first time slot.

At block 412, the first smoke alarm 200A emits the first alarm 262A at the first time slot. If the alert device 260 of the first smoke alarm 200A is operating properly then the user 16 will hear the first alarm 262A and enter a manual input via the input device 370 indicating that the user 16 has heard the first alarm 262A at block 414. At block 416, the mobile device 300 conveys that the first alarm 262 was confirmed to the computer application 350 and the computer application 350, block 417, may display a message on the mobile device 300 via the display device 380 indicating that the first smoke alarm 200A has passed the test in response to the manual input confirming the user 16 heard the first alarm 262. The manual input confirming the user 16 heard the first alarm 262 may be a touch to the input device 370 (e.g., touchscreen) or a shake to the entire mobile device 300 which shakes the input device 370.

The user 16 may have a designated response time period during which the user 16 may enter the manual input confirming the user 16 heard the first alarm 262. The designated response time may be less than or equal to the time period between the first time slot and the second time slot. If the input device 370 does not receive any manual input during the designated response time period or between the first time slot and the second time slot then it would indicate that the user 16 did not hear the first alarm 262A activated by the first smoke alarm 200A and perhaps the alert device 260 of the first smoke alarm 200A is not operating properly. Blocks 414 and 416 in FIG. 2 would not exit if the user 16 does not hear the first alarm 262A. If the first alarm 262A is not confirmed by the user 16 then the computer application 350 may display a message on the mobile device 300 via the display device 380 indicating that the first smoke alarm 200A has failed the test in response to not receiving any manual input within the designated response time after the first smoke alarm 200A has activated the first alarm 262.

At block 418, the second smoke alarm 200B emits the second alarm 262B at the second time slot. If the alert device 260 of the second smoke alarm 200 is operating properly then the user 16 will hear the second alarm 262B and enter a manual input via the input device 370 indicating that the user 16 has heard the second alarm 262B at block 420. At block 422, the mobile device 300 conveys that the second alarm 262 was confirmed to the computer application 350 and the computer application 350, at block 224, may display a message on the mobile device 300 via the display device 380 indicating that the second smoke alarm 200B has passed the test in response to the manual input confirming the user 16 heard the second alarm 262. The manual input confirming the user 16 heard the second alarm 262 may be a touch to the input device 370 (e.g., touch screen) or a shake to the entire mobile device 300 which shakes the input device 370.

The user 16 may have a designated response time period during which the user 16 may enter the manual input confirming the user 16 heard the second alarm 262. The designated response time may be less than or equal to the time period between the second time slot and the second time slot. If the input device 370 does not receive any manual input during the designated response time period then it would indicate that the user 16 did not hear the second alarm 262B activated by the second smoke alarm 200A and perhaps the alert device 260 of the second smoke alarm 200A is not operating properly. Blocks 420 and 422 in FIG. 2 would not exit if the user 16 does not hear the second alarm 262B. If the second alarm 262B is not confirmed by the user 16 then the computer application 350 may display a message on the mobile device 300 via the display device 380 indicating that the second smoke alarm 200B has failed the test in response to not receiving any manual input within the designated response time after the second smoke alarm 200B has activated the second alarm 262.

While the above description has described the flow process of FIG. 2 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of testing a smoke alarm system, the method comprising:

receiving a first manual input via an input device of a mobile device from a user of the mobile device, the first manual input indicating that the user would like to initiate a test of the smoke alarm system comprising one or more smoke alarms, the one or more smoke alarms comprising at least a first smoke alarm;

determining, by a computer application, a time slot allocation, the time slot allocation indicating when each of the one or more smoke alarms should emit an alarm;

transmitting, by a gateway device, the time slot allocation to each of the one or more smoke alarms, wherein each of the one or more smoke alarms is configured to activate the alarm in accordance with the time slot allocation;

activating a first alarm on the first smoke alarm in accordance with a first time slot included in the time slot allocation transmitted to each of the one or more smoke alarms; and receiving a second manual input via the input device of the mobile device from the user of the mobile device, the second manual input indicating that the user has heard the first alarm;

wherein the one or more smoke alarms further comprises a second smoke alarm, and wherein the time slot allocation indicates that the first smoke alarm should emit the first alarm at the first time slot and the second smoke alarm should emit a second alarm at a second time slot, the second time slot occurring after the first time slot.

2. The method of claim 1, further comprising:

activating the alarm on each of the one or more smoke alarms in accordance with the time slot allocation.

3. The method of claim 1, wherein receiving the second manual input via the input device further comprises detecting the user shaking the mobile device.

4. The method of claim 1, wherein receiving the second manual input via the input device further comprises detecting the user touching a touch screen or a button of the mobile device.

5. The method of claim 1, further comprising:

displaying a message on a display device of the mobile device indicating that the first smoke alarm has passed the test in response to the second manual input.

6. The method of claim 1, wherein the second manual input is received within a designated response time after the first smoke alarm has activated the first alarm.

7. The method of claim 6, further comprising:

displaying a message on a display device of the mobile device indicating that the first smoke alarm has passed the test in response to the second manual input.

8. The method of claim 1, further comprising:

activating the second alarm on the second smoke alarm at the second time slot.

9. The method of claim 8, further comprising:

not receiving any manual input within a designated response time after the first smoke alarm has activated the first alarm or between the first time slot and the second time slot;

receiving a second manual input via the input device of the mobile device from the user of the mobile device, the second manual input indicating that the user has heard the second alarm.

10. The method of claim 9, further comprising:

displaying a first message on a display device of the mobile device indicating that the first smoke alarm has failed the test in response to not receiving any manual input within the designated response time after the first smoke alarm has activated the first alarm or between the first time slot and the second time slot; and displaying a second message on the display device of the mobile device indicating that the second smoke alarm has passed the test in response to the second manual input.

11. The method of claim 8, further comprising:

receiving a second manual input via the input device of the mobile device from the user of the mobile device, the second manual input indicating that the user has heard the first alarm; and receiving a third manual input via the input device of the mobile device from the user of the mobile device, the second manual input indicating that the user has heard the second alarm.

12. The method of claim 9, further comprising:

displaying a first message on the mobile device indicating that the first smoke alarm has passed the test in response to the second manual input; and displaying a second message on the mobile device indicating that the first smoke alarm has passed the test in response to the third manual input.

13. The method of claim 8, further comprising:

receiving a second manual input via the input device of the mobile device from the user of the mobile device, the second manual input indicating that the user has heard the second alarm; and not receiving any manual input within a designated response time after the second smoke alarm has activated the second alarm.

14. The method of claim 9, further comprising:

displaying a first message on the mobile device indicating that the first smoke alarm has passed the test in response to the second manual input; and displaying a second message on the mobile device indicating that the second smoke alarm has failed the test in response to not receiving any manual input within a designated response time after the second smoke alarm has activated the second alarm.

15. A computer program product tangibly embodied on a non-transitory computer readable medium, the computer program product including instructions that, when executed by a processor, cause the processor to perform operations comprising:

receiving a first manual input via an input device of a mobile device from a user of the mobile device, the first manual input indicating that the user would like to initiate a test of the smoke alarm system comprising one or more smoke alarms, the one or more smoke alarms comprising at least a first smoke alarm;

determining, by a computer application, a time slot allocation, the time slot allocation indicating when each of the one or more smoke alarms should emit an alarm;

transmitting, by a gateway device, the time slot allocation to each of the one or more smoke alarms, wherein each of the one or more smoke alarms is configured to activate the alarm in accordance with the time slot allocation;

activating a first alarm on the first smoke alarm in accordance with a first time slot included in the time slot allocation transmitted to each of the one or more smoke alarms; and receiving a second manual input via the input device of the mobile device from the user of the mobile device, the second manual input indicating that the user has heard the first alarm;

wherein the one or more smoke alarms further comprises a second smoke alarm, and wherein the time slot allocation indicates that the first smoke alarm should emit the first alarm at the first time slot and the second smoke alarm should emit a second alarm at a second time slot, the second time slot occurring after the first time slot.

* * * * *